US012117130B2

(12) United States Patent
Chow et al.

(10) Patent No.: US 12,117,130 B2
(45) Date of Patent: Oct. 15, 2024

(54) TRANSFER PORT SYSTEM FOR CRYOGENIC ENVIRONMENTS

(71) Applicant: International Business Machines Corporation, Armonk, NY (US)

(72) Inventors: Jerry M. Chow, Scarsdale, NY (US); Patryk Gumann, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 17/144,803

(22) Filed: Jan. 8, 2021

(65) Prior Publication Data

US 2022/0221105 A1 Jul. 14, 2022

(51) Int. Cl.
*F17C 3/08* (2006.01)
*F25D 19/00* (2006.01)
(52) U.S. Cl.
CPC ............ *F17C 3/085* (2013.01); *F25D 19/006* (2013.01); *F17C 2203/0391* (2013.01)
(58) Field of Classification Search
CPC .............. F17C 3/085; F17C 2201/0119; F17C 2203/0391; F17C 2203/0646; F25D 19/006; F25D 19/00; F25B 9/10
See application file for complete search history.

(56) References Cited

U.S. PATENT DOCUMENTS

| 4,510,758 A | 4/1985 | Tench, Jr. |
| 4,635,450 A | 1/1987 | Laskaris |
| 4,870,838 A * | 10/1989 | Zeamer .................. F25J 1/0276 62/50.7 |
| 4,944,155 A * | 7/1990 | Alexander ................ F17C 3/08 62/51.1 |
| 2014/0202179 A1 * | 7/2014 | Batey ........................ F25B 9/12 62/190 |
| 2020/0363014 A1 | 11/2020 | Hart et al. |

FOREIGN PATENT DOCUMENTS

EP    2 742 299 A2    6/2014

OTHER PUBLICATIONS

International Search Report and Written Opinion received for PCT Application Serial No. PCT/EP2021/087867 dated May 3, 2022, 10 pages.
Wiktionary "mechanism" Wiktionary, https://en.wiktionary.org/wiki/mechanism, Last Accessed Mar. 19, 2024, 2 pages.
Wiktionary "facilitate" Wiktionary, https://en.wiktionary.org/wiki/facilitate, Last Accessed Mar. 19, 2024, 4 pages.

(Continued)

*Primary Examiner* — Miguel A Diaz
*Assistant Examiner* — Ibrahim A. Michael Adeniji
(74) *Attorney, Agent, or Firm* — Amin, Turocy & Watson, LLP

(57) ABSTRACT

Techniques facilitating transfer port systems for cryogenic environments are provided. In one example, an outer vacuum chamber of a cryostat can comprise a sidewall encompassing an inner chamber comprising a sample mounting surface. The sidewall can comprise a feedthrough port providing access to the sample mounting surface from a region external to the outer vacuum chamber.

20 Claims, 7 Drawing Sheets

(56) References Cited

OTHER PUBLICATIONS

Wiktionary "mount" Wiktionary, https://en.wiktionary.org/wiki/mount#Verb, Last Accessed Mar. 19, 2024, 8 pages.
Response to Communication Pursuant to Rules 161(1) and 162 EPC in European Patent Application No. 21847974.9 dated Feb. 19, 2024, 5 pages.

* cited by examiner

TRANSFER PORT SYSTEM FOR CRYOGENIC ENVIRONMENTS

BACKGROUND

The subject disclosure relates to cryogenic environments, and more specifically, to transfer port systems for cryogenic environments.

Exchanging samples positioned on sample mounting surfaces of a cryogenic environment such as a cryostat can be time consuming and energy inefficient. For example, accessing a sample mounting surface to exchange samples can involve warming up an inner chamber of a cryostat housing the sample mounting surface to room temperature. Accessing the sample mounting surface can also involve venting an outer vacuum chamber to increase pressure within the outer vacuum chamber to ambient pressure. Once a sample is loaded onto the sample mounting surface, the process can be reversed by reducing pressure within the outer vacuum chamber and cooling down the inner chamber of the cryostat to cryogenic temperatures.

Some cryostats employ top-loading or bottom-loading sample exchange mechanisms to mitigate the time and energy costs associated with changing samples positioned on sample mounting surfaces. To that end, such top-loading or bottom sample exchange mechanisms can involve attaching a sample to a probe that is communicatively coupled with a sample mounting surface via a vacuum tube. The probe can traverse the vacuum tube to bring the sample into mechanical and thermal contact with the sample mounting surface. In doing so, cryogenic temperatures can be maintained within an inner chamber housing the sample mounting surface and vacuum conditions can be maintained within an outer vacuum chamber encompassing the inner chamber while exchanging samples. As such, top-loading or bottom-loading sample exchange mechanisms can mitigate the time and energy costs associated with changing samples positioned on sample mounting surfaces.

However, the scalability of cryostats employing top-loading or bottom-loading sample exchange mechanisms can be limited. For example, top-loading or bottom-loading sample exchange mechanisms generally involve increased vertical clearance requirements. In some instances, an additional 0.7 meters or more of vertical clearance can be involved in employing a bottom-loading sample exchange mechanism and an additional 1.5 meters or more of vertical clearance can be involved in employing a top-loading sample exchange mechanism. As another example, top-loading or bottom-loading sample exchange mechanisms are generally incapable of concurrently exchanging multiple samples.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, and/or methods that facilitate transfer port systems for cryogenic environments are described.

According to an embodiment, an outer vacuum chamber of a cryostat can comprise a sidewall encompassing an inner chamber comprising a sample mounting surface. The sidewall can comprise a feedthrough port providing access to the sample mounting surface from a region external to the outer vacuum chamber. One aspect of such an outer vacuum chamber is that the outer vacuum chamber can facilitate reducing vertical clearance requirements for cryostats.

In an embodiment, the outer vacuum chamber can further comprise a vacuum valve coupled to the feedthrough port that maintains a pressure differential between an ambient environment and an interior of the outer vacuum chamber. One aspect of such an outer vacuum chamber is that the outer vacuum chamber can facilitate exchanging samples loaded on the sample mounting surface while maintaining vacuum conditions within the outer vacuum chamber.

According to another embodiment, a cryostat can comprise a sidewall intervening between a top plate and a bottom plate to form an outer vacuum chamber that encompasses an inner chamber comprising a sample mounting surface. The top plate can comprise a first feedthrough port and the bottom plate can comprise a second feedthrough port. The first and second feedthrough ports can provide respective lines of an input/output pair access to the sample mounting surface from an exterior of the outer vacuum chamber. The sample mounting surface can receive samples via a third feedthrough port disposed on the sidewall. One aspect of such a cryostat is that the cryostat can facilitate accommodating an increased number of feedthrough ports for passage of input/output lines.

In an embodiment, the first and second feedthrough ports are aligned with an axis that is orthogonal with the top plate. In an embodiment, the first and second feedthrough ports are aligned with an axis that is non-orthogonal with the top plate. One aspect of such cryostats is that such cryostats can facilitate increased flexibility for routing input/output lines.

According to another embodiment, a cryostat can comprise an inner chamber comprising a sample mounting surface and a first feedthrough port aligned with a second feedthrough port disposed on a sidewall of an outer vacuum chamber encompassing the inner vacuum chamber to provide access to the sample mounting surface from a region external to the outer vacuum chamber. One aspect of such a cryostat is that the cryostat can mitigate thermal losses associated with exchanging samples loaded on to the sample mounting surface.

In an embodiment, the inner chamber further comprises a plurality of feedthrough ports including the first feedthrough port. The plurality of feedthrough ports being aligned with corresponding feedthrough ports disposed on the sidewall of the outer vacuum to provide access to the sample mounting surface from the region external to the outer vacuum chamber. One aspect of such a cryostat is that the cryostat can facilitate concurrently exchanging multiple samples.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
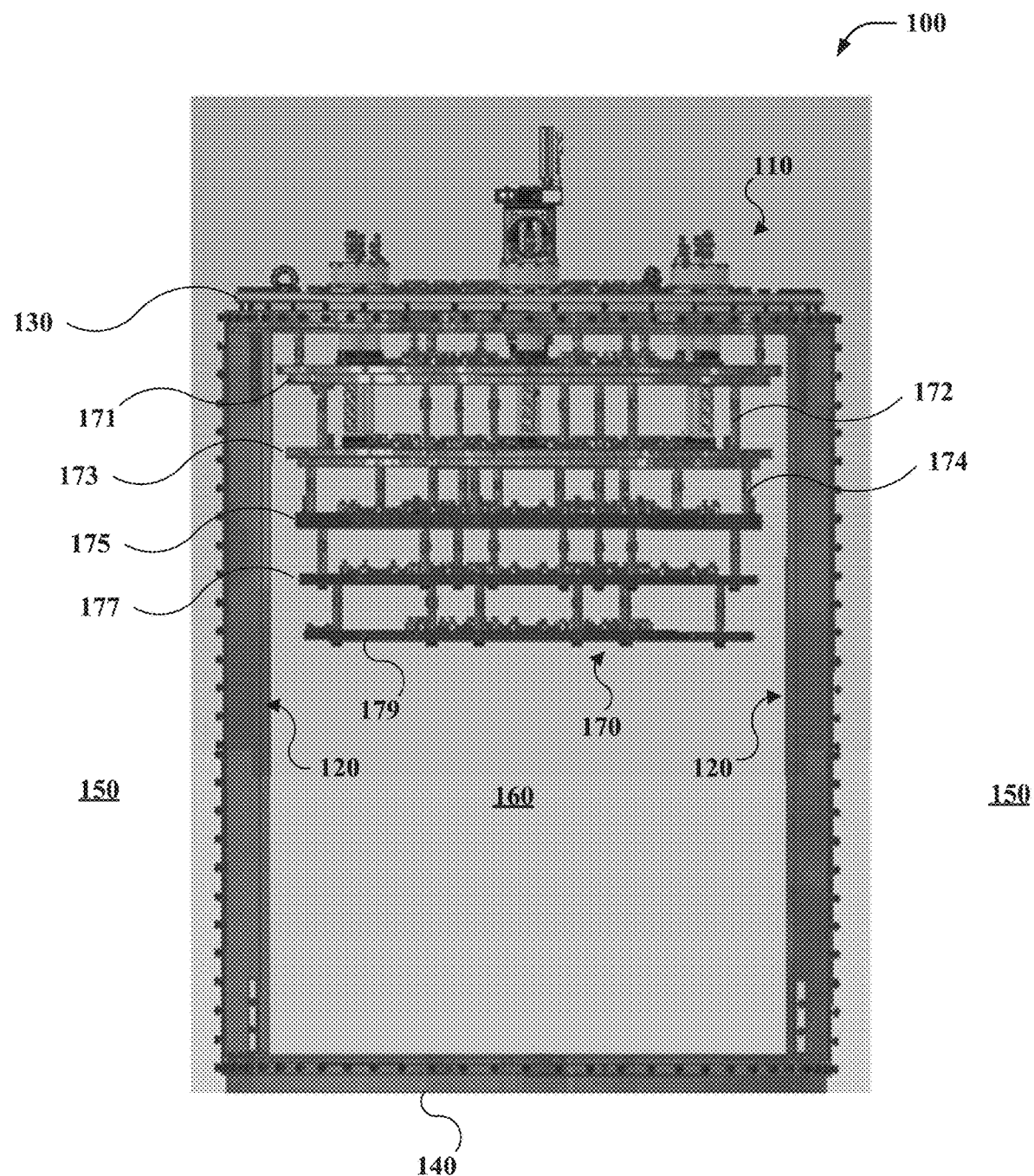
FIG. 1 illustrates an example, non-limiting cryostat, in accordance with one or more embodiments described herein.

FIG. 1 illustrates an example, non-limiting cryostat 100, in accordance with one or more embodiments described herein. As shown in FIG. 1, cryostat 100 comprises an outer vacuum chamber 110 formed by a sidewall 120 intervening between a top plate 130 and a bottom plate 140. In operation, outer vacuum chamber 110 can maintain a pressure differential between an ambient environment 150 of outer vacuum chamber 110 and an interior 160 of outer vacuum chamber 110. Cryostat 100 further comprises a plurality of thermal stages (or stages) 170 disposed within interior 160 that are each mechanically coupled to top plate 130. The plurality of stages 170 includes: stage 171, stage 173, stage 175, stage 177, and stage 179. Each stage among the plurality of stages 170 can be associated with a different temperature. For example, stage 171 can be associated with a temperature of 50 Kelvin (K), stage 173 can be associated with a temperature of 4 K, stage 175 can be associated with a temperature of 700 millikelvin (mK), stage 177 can be associated with a temperature of 100 mK, and stage 179 can be associated with a temperature of 10 mK. Each stage among the plurality of stages 170 is spatially isolated from other stages of the plurality of stages 170 by a plurality of support rods (e.g., support rods 172 and 174). In an embodiment, stage 175 can be a Still stage, stage 177 can be a Cold Plate stage, and stage 179 can be a Mixing Chamber stage.

Embodiments described herein address the deficiencies discussed above to facilitate efficient and scalable cryostat sample exchanges. For example, as discussed above, employing top-loading or bottom-loading sample exchange mechanisms can involve an additional vertical clearance for cryostats of 1.5 meters or 0.7 meters, respectively. In contrast, embodiments described herein implement side-loading sample exchange mechanism that can reduce vertical clearance requirements for cryostats. As another example, top-loading or bottom-loading sample exchange mechanisms are generally incapable of concurrently exchanging multiple samples. In contrast, embodiments described herein implement multiple side-loading sample exchange mechanisms to facilitate the concurrent exchange of multiple samples within a cryostat.

Figure 2:
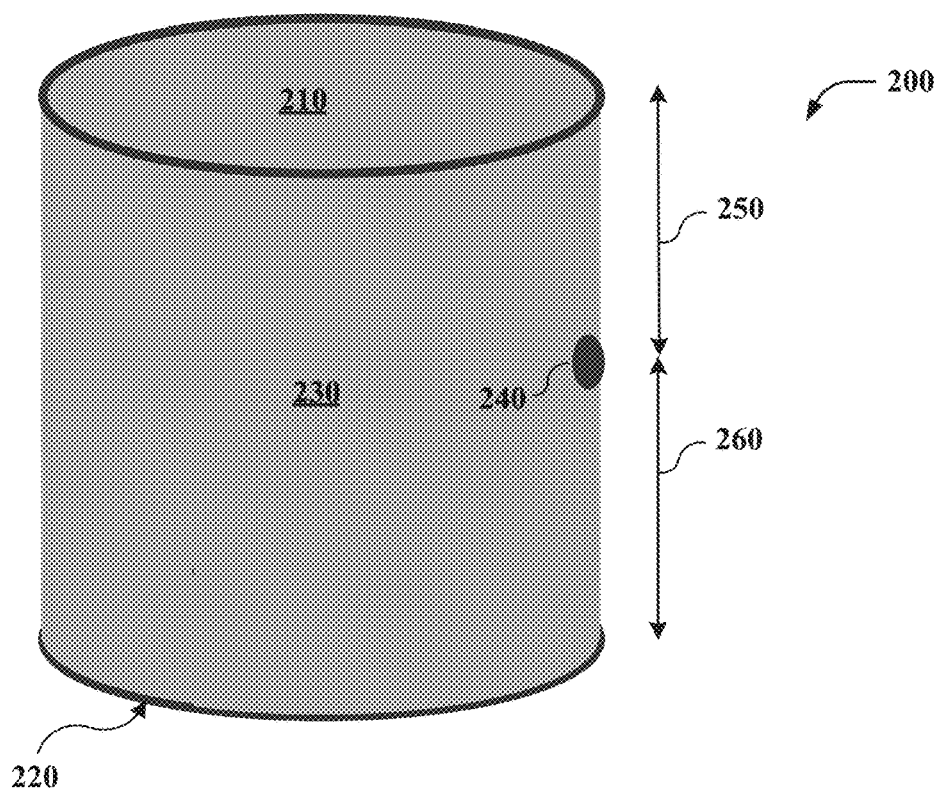
FIG. 2 illustrates an example, non-limiting outer vacuum chamber of a cryostat with a sidewall including a feedthrough port, in accordance with one or more embodiments described herein.

FIG. 2 illustrates an example, non-limiting outer vacuum chamber 200 that can facilitate implementing side-loading sample exchange mechanisms, in accordance with one or more embodiments described herein. In an embodiment, outer vacuum chamber 100 of FIG. 1 can be implemented using outer vacuum chamber 200. As shown by FIG. 2, outer vacuum chamber 200 can be formed by a sidewall 230 intervening between a top plate 210 and a bottom plate 220. Sidewall 230 includes a feedthrough port 240 that can provide access to a sample mounting surface positioned within outer vacuum chamber 200. In an embodiment, feedthrough port 240 can mitigate thermal losses associated with exchanging samples loaded on a sample mounting surface within an inner chamber encompassed by outer vacuum chamber 200. By mitigating such thermal losses, feedthrough port 240 can facilitate reducing sample cooldown times, cryostat operating times, and/or energy costs associated with cryostat cooling operations.

In FIG. 2, feedthrough port 240 depicted as being positioned approximately equidistant from top plate 210 and bottom plate 220. That is, distance 250 is approximately equal to distance 260. In some embodiments, feedthrough port 240 can be positioned closer to top plate 210. In other embodiments, feedthrough port 240 can be positioned closer to bottom plate 220. In embodiments where feedthrough port 240 is positioned off-center (e.g., closer to top plate 210 or closer to bottom plate 220), feedthrough port 240 can deviate from a mid-point between top plate 210 and bottom plate 220 by a threshold distance. In an embodiment, the threshold distance can be defined by a diameter of feedthrough port 240, a height of sidewall 230, a circumference of top plate 210 and/or bottom plate 220, a thickness of sidewall 230, or a combination thereof.

Figure 3:
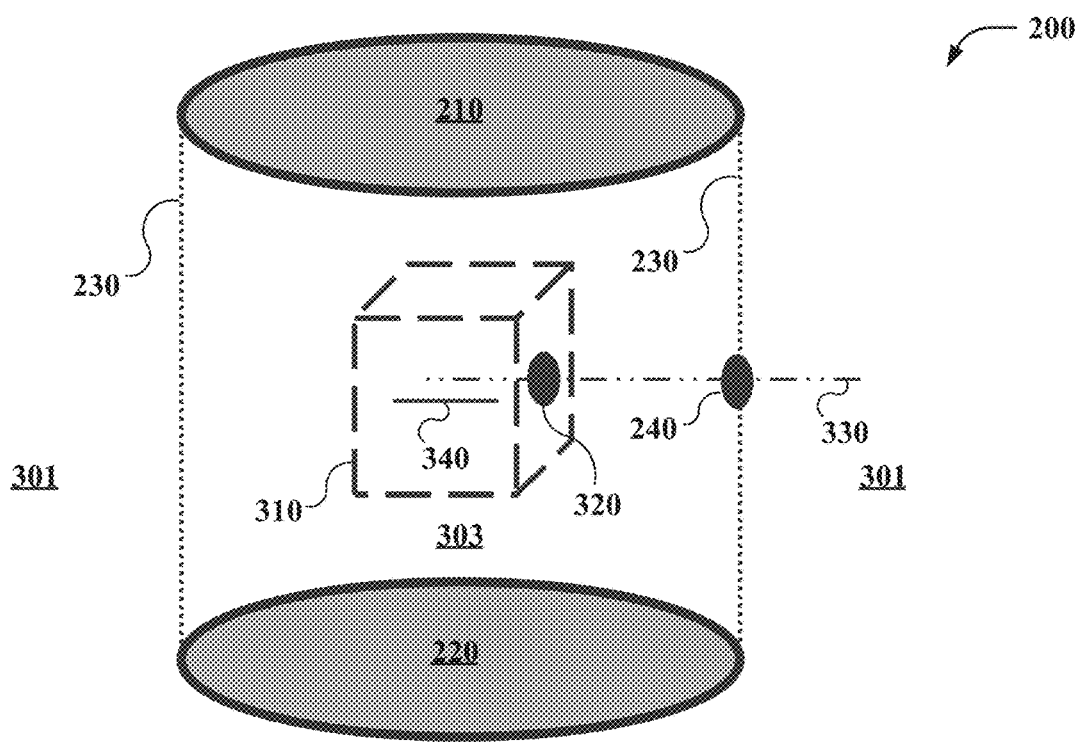
FIG. 3 illustrates an example, non-limiting outer vacuum chamber encompassing an inner chamber, in accordance with one or more embodiments described herein.

With reference to FIG. 3, sidewall 230 can encompass an inner chamber 310 positioned within an interior 303 of outer vacuum chamber 200. Feedthrough port 240 can provide access to sample mounting surface 340 of inner chamber 310 from a region 301 external to outer vacuum chamber 200. To facilitate that access, inner chamber 310 can comprise a feedthrough port 320 that can mitigate thermal losses associated with exchanging samples loaded on sample mounting surface 340. By mitigating such thermal losses, feedthrough port 320 can facilitate reducing sample cooldown times, cryostat operating times, and/or energy costs associated with cryostat cooling operations. In an embodiment, feedthrough port 320 is aligned with feedthrough port 240 such that those feedthrough ports form a line of clearance 330 between sample mounting surface 340 and the region 301 external to outer vacuum chamber 200. In an embodiment, sample mounting surface 340 can be thermally coupled to a Mixing Chamber stage of a cryostat (e.g., cryostat 100 of FIG. 1).

Figure 4:
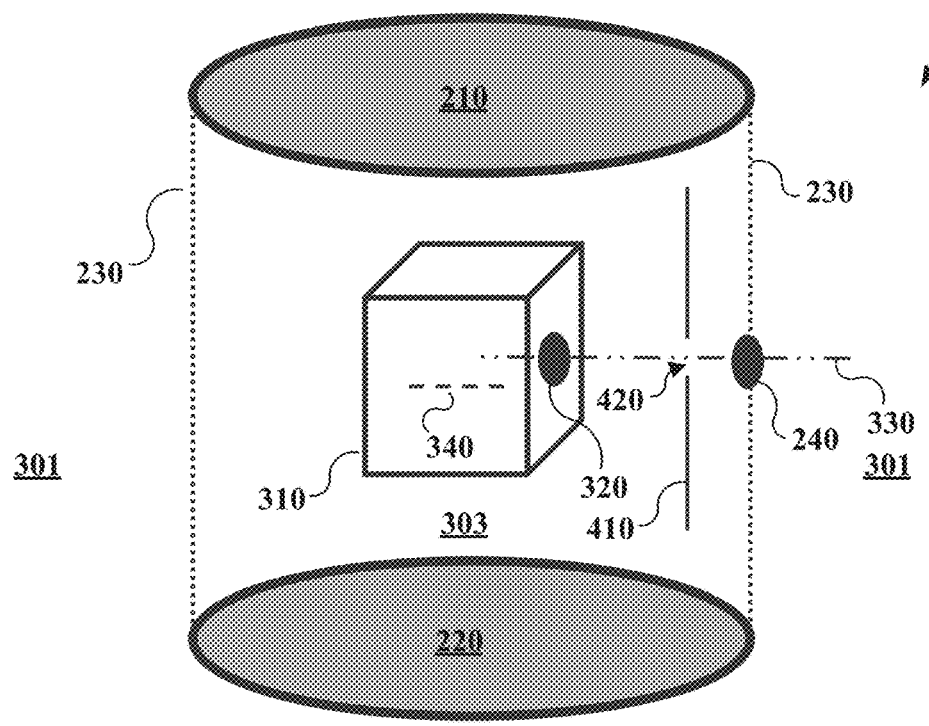
FIG. 4 illustrates the example, non-limiting outer vacuum chamber of FIG. 3 with a thermal shield intervening between a sidewall of the outer vacuum chamber and the inner chamber, in accordance with one or more embodiments described herein.

In various embodiments, a thermal shield 410 can intervene between feedthrough port 240 and sample mounting surface 340, as illustrated by FIG. 4. In an embodiment, thermal shield 410 can be mechanically coupled to a thermal plate associated with a thermal stage of a cryostat. For example, thermal shield 410 can be mechanically coupled to a thermal plate associated with a 50-K stage, a 4-K stage, a Still stage, or a Cold Plate stage. By virtue of intervening between feedthrough port 240 and sample mounting surface 340, thermal shield 410 can interrupt line of clearance 330. As such, thermal shield 410 can comprise a feedthrough port 420 to facilitate access to sample mounting surface 340 from the region 301 external to outer vacuum chamber 200. In an embodiment, feedthrough ports 240, 320, and/or 420 can be aligned such that those feedthrough ports form a line of clearance 330 between sample mounting surface 340 and the region 301 external to outer vacuum chamber 200.

Figure 5:
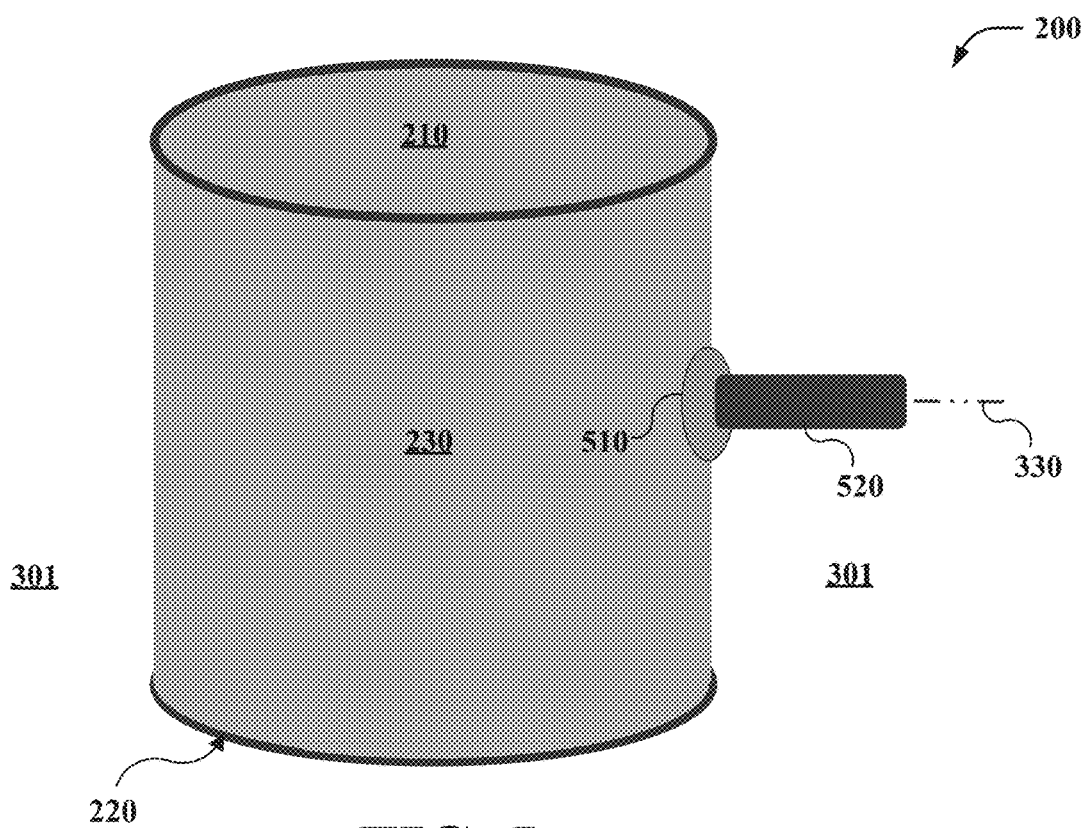
FIG. 5 illustrates an example, non-limiting outer vacuum chamber with a side loading mechanism, in accordance with one or more embodiments described herein.

With reference to FIG. 5, outer vacuum chamber 200 can further comprise a vacuum valve 510 coupled to feedthrough port 240. Vacuum valve 510 can maintain a pressure differential between an ambient environment (e.g., the region 301 external to outer vacuum chamber 200) and the interior 303 of outer vacuum chamber 200. As such, vacuum valve 510 can facilitate exchanging samples loaded on sample mounting surface 340 while maintaining vacuum conditions within outer vacuum chamber 200. In an embodiment, vacuum valve 510 can be implemented using a gate valve. In an embodiment, vacuum valve 510 can comprise: bronze, iron, stainless steel, cast steel, and the like. FIG. 5 also illustrates that outer vacuum chamber 200 can further comprise a loading mechanism 520 that can facilitate loading a sample onto sample mounting surface 340 via feedthrough port 240. In an embodiment, loading mechanism 520 can comprise edge welded bellows.

To the extent that it facilitates loading samples onto sample mounting surface 340 via feedthrough port 240 of sidewall 230—instead of via feedthrough ports provided by top plate 210 or bottom plate 220—loading mechanism 520 can comprise a side-loading sample exchange mechanism. By including feedthrough port 240 in sidewall 230 that can interface with such side-loading sample exchange mechanisms, outer vacuum chamber 200 can provide an alternative to outer vacuum chambers that interface with top-loading or bottom-loading sample exchange mechanisms. As such, outer vacuum chamber 200 facilitates reduced vertical clearance requirements for cryostats by avoiding the additional vertical clearances associated with employing top-loading or bottom-loading sample exchange mechanisms.

Figure 6:
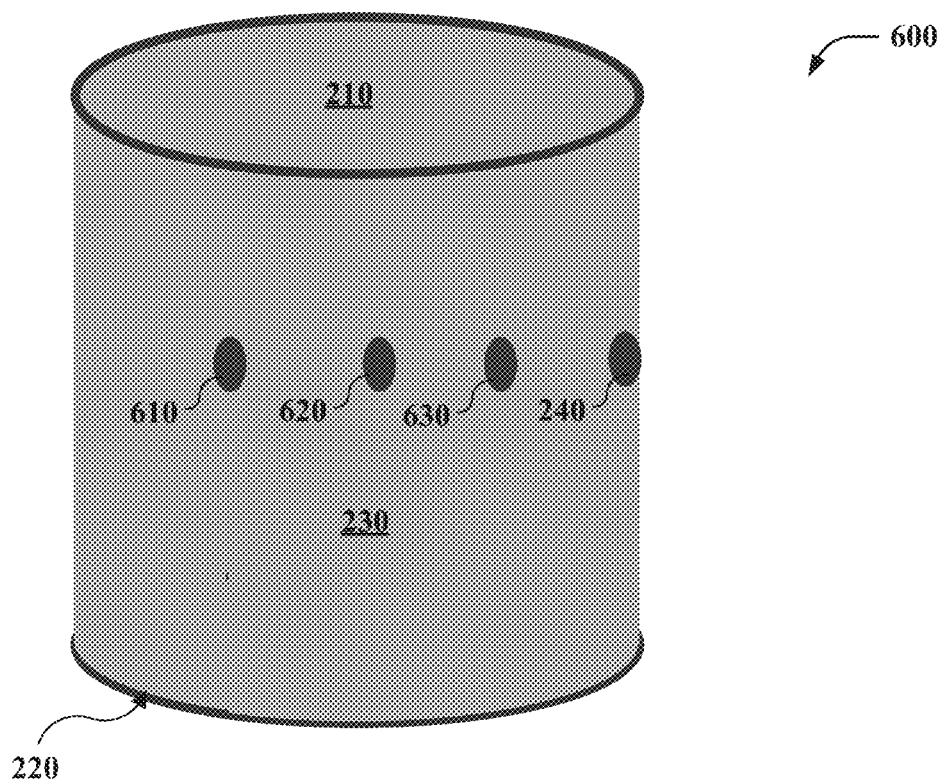
FIG. 6 illustrates an example, non-limiting outer vacuum chamber with a sidewall including multiple feedthrough ports, in accordance with one or more embodiments described herein.

In addition to facilitating reduced vertical clearance requirements for cryostats, embodiments described herein can also facilitate concurrently exchanging multiple samples within a cryostat. For example, as illustrated by FIG. 6, multiple feedthrough ports can be provided in a sidewall 230 of an outer vacuum chamber 600. In FIG. 6, the multiple feedthrough ports include feedthrough ports 240, 610, 620, and 630. Each feedthrough port of outer vacuum chamber 600 can be coupled to a vacuum valve 510 coupled to a loading mechanism (not shown). Each loading mechanism can facilitate loading a sample onto one or more sample mounting surfaces within outer vacuum chamber 600 via a vacuum valve (not shown) coupled to a respective feedthrough port. In an embodiment, such loading mechanisms and vacuum valves can be implemented using loading mechanism 520 and vacuum valve 510 of FIG. 5, respectively.

Figure 7:
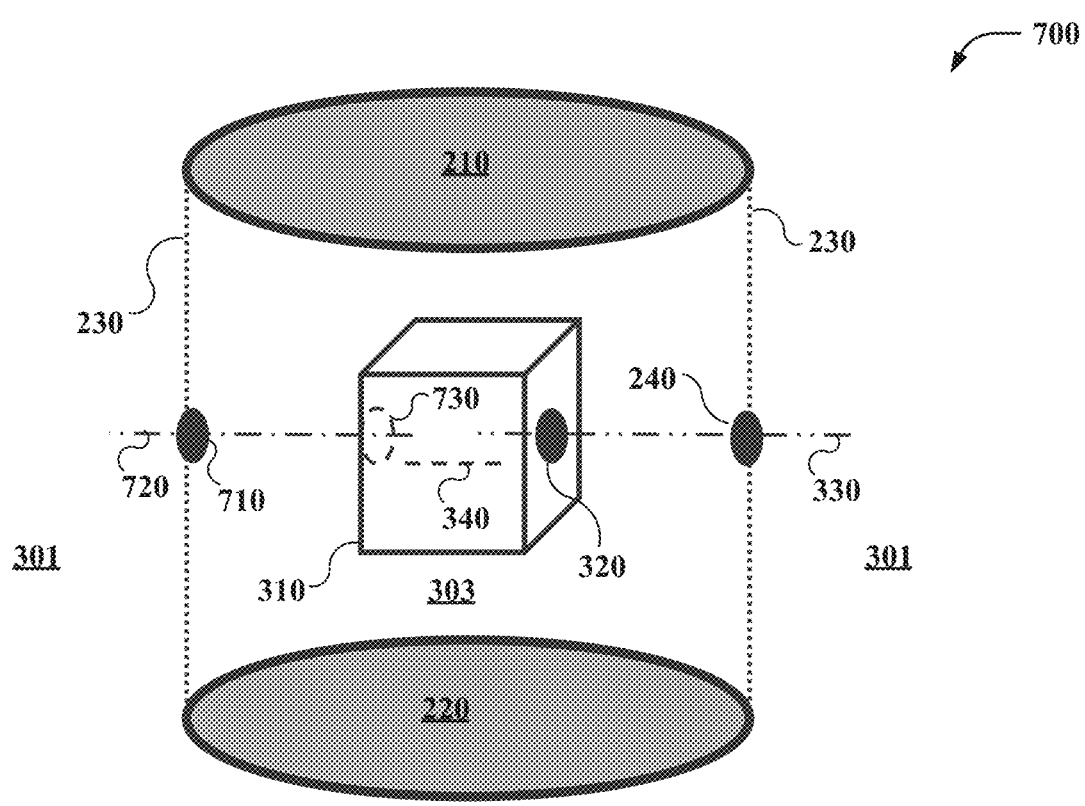
FIG. 7 illustrates an example, non-limiting outer vacuum chamber encompassing an inner chamber with multiple feedthrough ports, in accordance with one or more embodiments described herein.

By way of example, a sidewall 230 of an outer vacuum chamber 700 can comprise two feedthrough ports (e.g., feedthrough ports 240 and 710), as illustrated by FIG. 7. In FIG. 7, feedthrough ports 240 and 710 each provide access to sample mounting surface 340 from a region 301 external to outer vacuum chamber 700. To facilitate such access, inner chamber 310 can comprise multiple feedthrough ports that are each aligned with a given feedthrough port of sidewall 230. As shown by FIG. 7, inner chamber 310 comprises a feedthrough port 320 aligned with feedthrough port 240 and a feedthrough port 730 aligned with feedthrough port 710. Feedthrough ports 240 and 320 can be aligned such that those feedthrough ports form a line of clearance 330 between sample mounting surface 340 and the region 301 external to outer vacuum chamber 200. Moreover, feedthrough ports 710 and 730 can be aligned such that those feedthrough ports form a line of clearance 720 between sample mounting surface 340 and the region 301 external to outer vacuum chamber 200.

Figure 8:
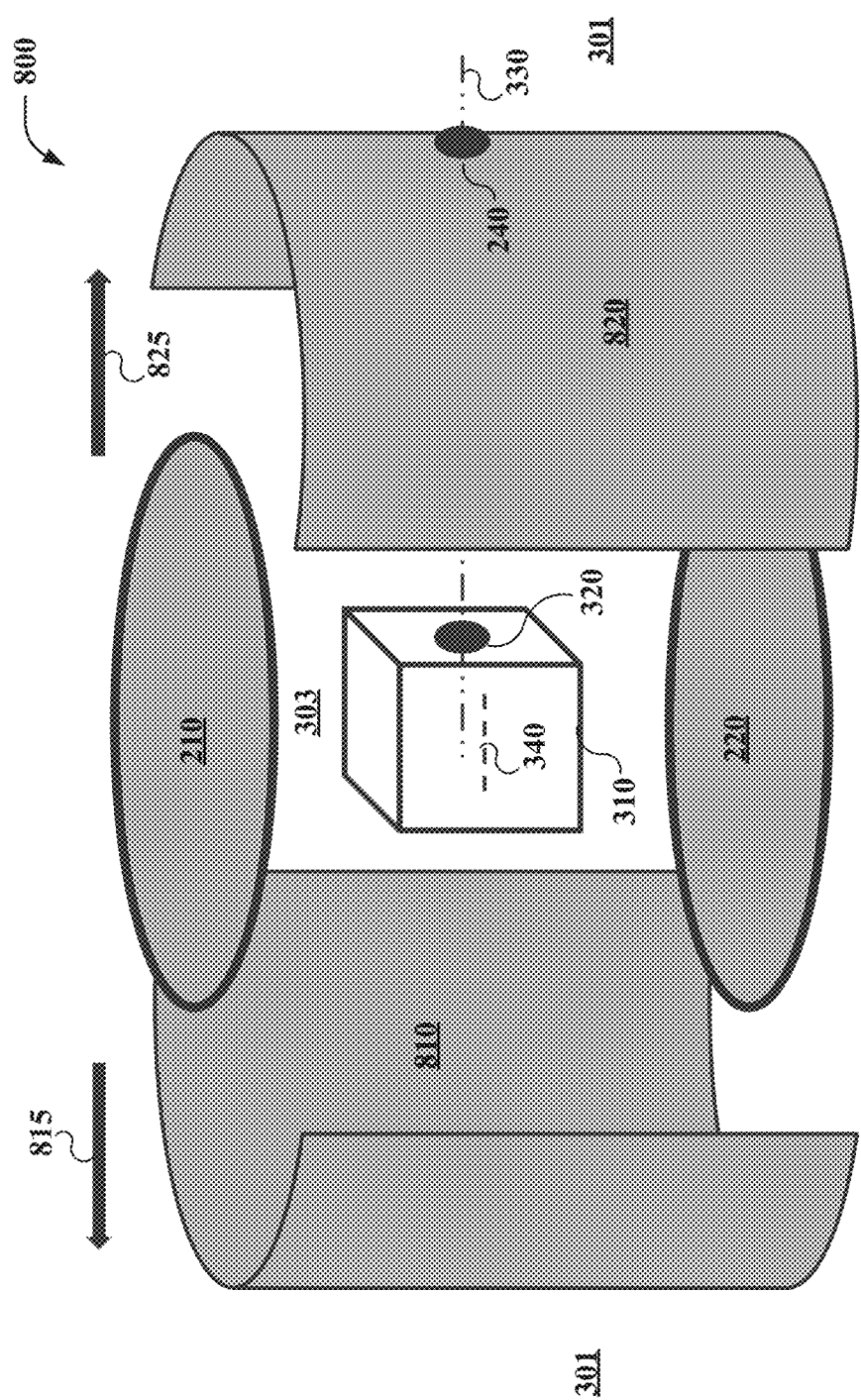
FIG. 8 illustrates an example, non-limiting outer vacuum chamber with a sidewall partitioned into multiple sections, in accordance with one or more embodiments described herein.

In various embodiments, a sidewall of an outer vacuum chamber can be partitioned into multiple sections to facilitate employing side-loading sample exchange mechanisms. By way of example, FIG. 8 illustrates an example, non-limiting outer vacuum chamber 800 with a sidewall partitioned into two sections—sections 810 and 820. As illustrated by FIG. 8, sections 810 and 820 each extend between top plate 210 and bottom plate 220 of outer vacuum chamber 800. In an embodiment, sections 810 and 820 can be removably coupled such that section 810 can be removed from outer vacuum chamber 800 in a direction 815 and section 820 can be removed from outer vacuum chamber 800 in a direction 825 that opposes direction 815. In FIG. 8, section 820 comprises a feedthrough port 240 that provides access to sample mounting surface 340 from a region 301 external to the outer vacuum chamber 800 whereas section 810 lacks any such feedthrough ports. However, one skilled in the art will appreciate that sections 810 and 820 can each include one or more feedthrough ports that provide access to a sample mounting surface positioned within outer vacuum chamber 800 in accordance with embodiments described herein.

Cryostats comprising outer vacuum chambers that interface with top-loading or bottom-loading sample exchange mechanisms generally provide feedthrough ports for passage of input/output lines on a single side due to setup requirements associated with top-loading or bottom-loading sample exchange mechanisms. For example, some cryostats that interface with bottom-loading sample exchange mechanisms can involve lowering a sidewall and a bottom plate of an outer vacuum chamber down during setup. To accommodate for such lowering of the sidewall and bottom plate during setup, feedthrough ports for passage of input/output lines can be provided on a top plate of the outer vacuum chamber.

In contrast, setup requirements for side-loading sample exchange mechanisms can facilitate providing feedthrough ports for passage of input/output lines on multiple sides of an outer vacuum chamber. As such, another aspect of employing side-loading sample exchange mechanisms is that outer vacuum chambers interfacing with such sample exchange mechanisms can accommodate an increased number of feedthrough ports for passage of input/output lines. By way of example, FIG. 9 illustrates an example, non-limiting outer vacuum chamber 900 with a top plate 210 comprising a feedthrough port 910 and a bottom plate 220 comprising a feedthrough port 930.

Figure 9:
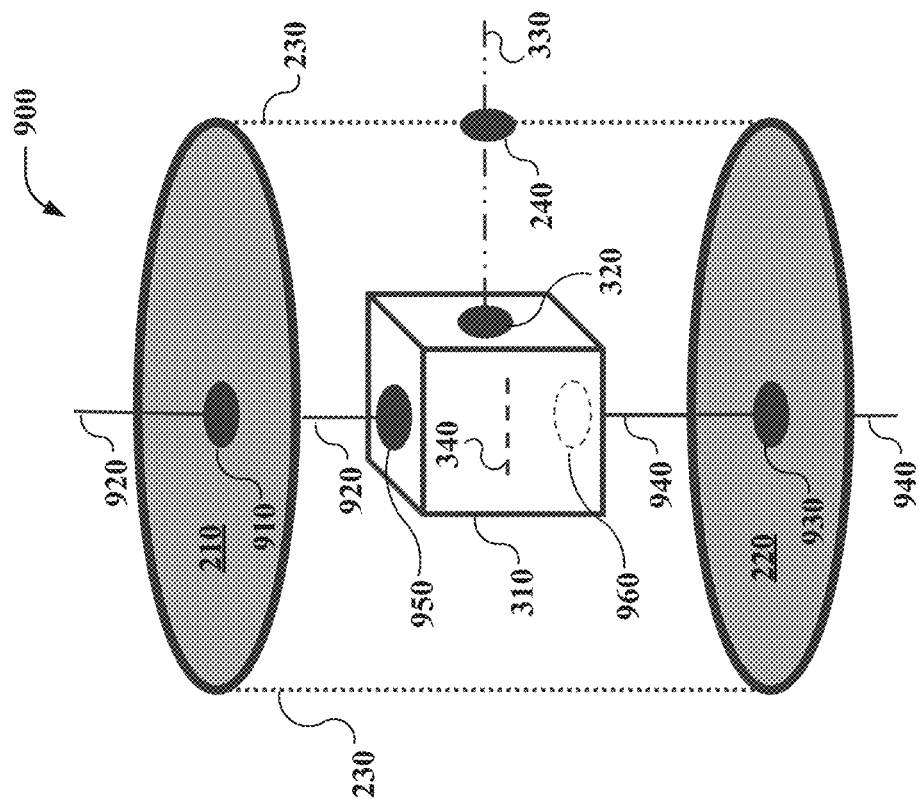
FIG. 9 illustrates an example, non-limiting outer vacuum chamber with top and bottom plates having feedthrough ports providing respective lines of an input/output pair sample mounting surface access, in accordance with one or more embodiments described herein.

In FIG. 9, feedthrough ports 910 and 930 provide respective lines of an input/output pair access to sample mounting surface 340 from an exterior of outer vacuum chamber 900. For example, one line of the input/output pair accessing sample mounting surface 340 via feedthrough ports 910 or 930 can propagate input to a sample loaded onto sample loading surface 340 via feedthrough port 240 while the remaining line of the input/output pair can propagate output from the sample responsive to the input.

To facilitate such access, inner chamber 310 can comprise feedthrough ports 950 and 960 that align with feedthrough port 910 of top plate 210 and feedthrough port 930 of bottom plate 230, respectively. Feedthrough ports 910 and 950 can be aligned such that those feedthrough ports form a line of clearance 920 between sample mounting surface 340 and the exterior of outer vacuum chamber 900. Moreover, feedthrough ports 930 and 960 can be aligned such that those feedthrough ports form a line of clearance 940 between sample mounting surface 340 and the exterior of outer vacuum chamber 900.

Figure 10:
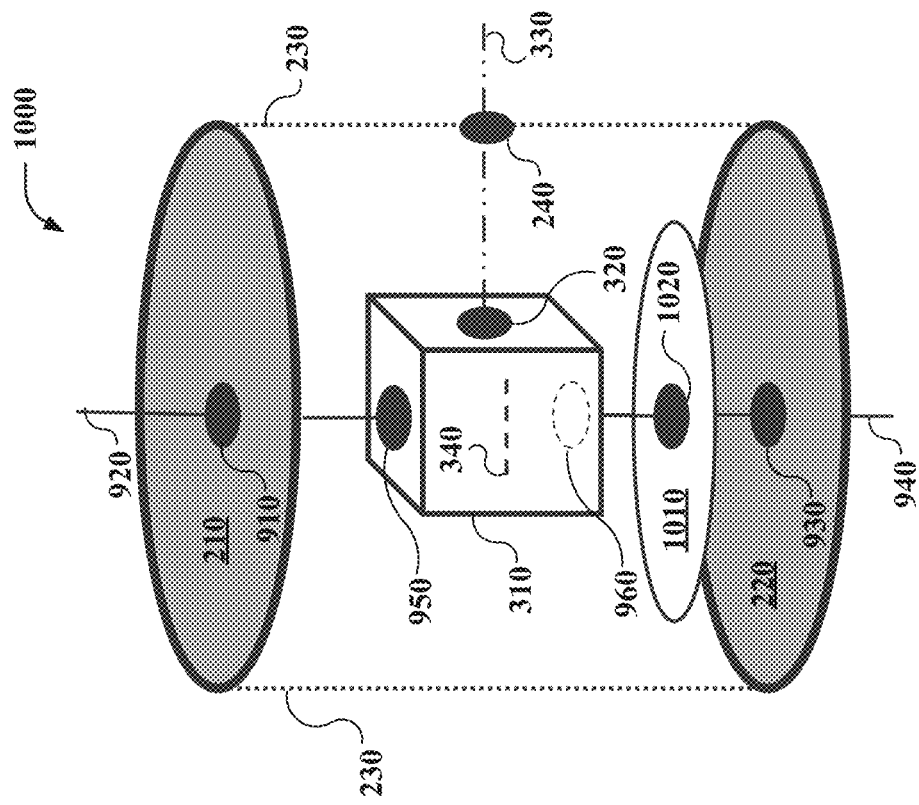
FIG. 10 illustrates the example, non-limiting outer vacuum chamber of FIG. 9 with a thermal plate intervening between the bottom plate and the sample mounting surface, in accordance with one or more embodiments described herein.

In various embodiments, a thermal plate can intervene between a feedthrough port providing a line of an input/output pair access to a sample mounting surface from an exterior of an outer vacuum chamber. For example, FIG. 10 illustrates a thermal plate 1010 intervening between feedthrough port 930 of bottom plate 220 and sample mounting surface 340. In an embodiment, thermal plate 1010 can be associated with a thermal stage of a cryostat. For example, thermal plate 1010 can be associated with a 50-K stage, a 4-K stage, a Still stage, or a Cold Plate stage.

By virtue of intervening between feedthrough port 930 and sample mounting surface 340, thermal plate 1010 can interrupt line of clearance 940. As such, thermal plate 1010 can comprise a feedthrough port 1020 to facilitate access to sample mounting surface 340 from the exterior of outer vacuum chamber 900. In an embodiment, feedthrough ports 930, 960, and/or 1020 can be aligned such that those feedthrough ports form a line of clearance 940 between sample mounting surface 340 and the exterior of outer vacuum chamber 900. While FIG. 10 illustrates thermal plate 1010 as intervening between bottom plate 220 and sample mounting surface 340, one skilled in the art will appreciate that thermal plate 1010 can also intervene between top plate 210 and sample mounting surface 340.

In addition to facilitating an increased number of feedthrough ports for passage of input/output lines through an outer vacuum chamber of a cryostat, embodiments described herein can also facilitate increased flexibility for routing such input/output lines. For example, a top plate 210 and a bottom plate 220 of an outer vacuum chamber 1100 each include multiple feedthrough ports that can provide respective lines of an input/output pair access to a sample mounting surface from an exterior of outer vacuum chamber 1100. In outer vacuum chamber 1100, the multiple feedthrough ports can include feedthrough ports 1105, 1110, 1150, 1155, and 1160.

Figure 11:
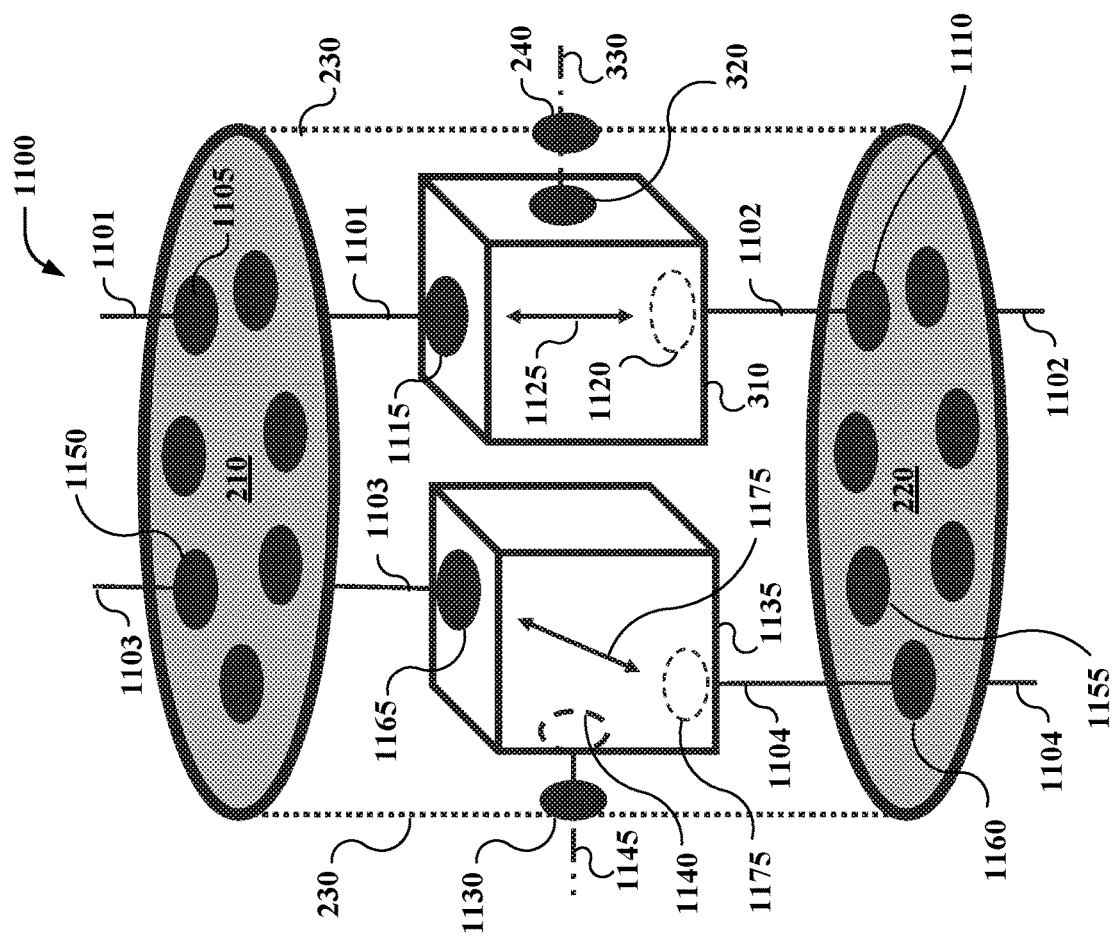
FIG. 11 illustrates an example, non-limiting outer vacuum chamber with top and bottom plates each having multiple feedthrough ports providing respective lines of input/output pairs sample mounting surface access, in accordance with one or more embodiments described herein.

As illustrated by FIG. 11, feedthrough port 1105 of top plate 210 and feedthrough port 1110 of bottom plate 220 provide respective lines of an input/output pair access to a sample mounting surface (not shown) within inner chamber 310 from an exterior of outer vacuum chamber 1100. To facilitate such access, inner chamber 310 can comprise feedthrough ports 1115 and 1120 that align with feedthrough port 1105 of top plate 210 and feedthrough port 1110 of bottom plate 230, respectively. Feedthrough ports 1105 and 1115 can be aligned such that those feedthrough ports form a line of clearance 1101 between the sample mounting surface (not shown) within inner chamber 310 and the exterior of outer vacuum chamber 1100. Moreover, feedthrough ports 1110 and 1120 can be aligned such that those feedthrough ports form a line of clearance 1102 between the sample mounting surface (not shown) within inner chamber 310 and the exterior of outer vacuum chamber 1100.

FIG. 11 further illustrates that feedthrough port 1150 of top plate 210 and feedthrough port 1160 of bottom plate 220 provide respective lines of an input/output pair access to a sample mounting surface (not shown) within inner chamber 1135 from an exterior of outer vacuum chamber 1100. To facilitate such access, inner chamber 1135 can comprise feedthrough ports 1165 and 1170 that align with feedthrough port 1150 of top plate 210 and feedthrough port 1160 of bottom plate 230, respectively. Feedthrough ports 1150 and 1165 can be aligned such that those feedthrough ports form a line of clearance 1103 between the sample mounting surface (not shown) within inner chamber 1135 and the exterior of outer vacuum chamber 1100. Moreover, feedthrough ports 1160 and 1170 can be aligned such that those feedthrough ports form a line of clearance 1104 between the sample mounting surface (not shown) within inner chamber 1135 and the exterior of outer vacuum chamber 1100.

A comparison between the arrangement of feedthrough ports (e.g., feedthrough ports 1105 and 1110) providing respective lines of an input/output pair access to the sample mounting surface (not shown) within inner chamber 310 and the arrangement of feedthrough ports (e.g., feedthrough ports 1150 and 1160) providing respective lines of an input/output pair access to the sample mounting surface (not shown) within inner chamber 1135 illustrates an aspect of facilitating increased flexibility for routing such input/output lines. For example, feedthrough ports 1105 and 1110 that provide respective lines of an input/output pair access to the sample mounting surface (not shown) within inner chamber 310 are aligned with an axis 1125 that is orthogonal with top plate 210.

In contrast, feedthrough ports 1150 and 1160 that provide respective lines of an input/output pair access to the sample mounting surface (not shown) within inner chamber 1135 are aligned with an axis 1175 that is non-orthogonal with top plate 210. Feedthrough ports 1150 and 1155 could alternatively provide respective lines of the input/output pair access to the sample mounting surface (not shown) within inner chamber 1135 if design constraints call for orthogonal alignment with respect to top plate 210. Yet, in the example illustrated by FIG. 11, design constraints called for non-orthogonal alignment with respect to top plate 210. As such, feedthrough ports 1150 and 1160 were utilized to provide respective lines of the input/output pair access to the sample mounting surface (not shown) within inner chamber 1135.

In FIG. 11, the multiple feedthrough ports of top plate 210 and bottom plate 220 are illustrated as providing respective lines of input/output pairs access to different sample mounting surfaces (not shown) positioned within different inner chambers (e.g., inner chambers 310 and 1135). In an embodiment, the multiple feedthrough ports of top plate 210 and bottom plate 220 can provide respective lines of input/output pairs access to a single sample mounting surface. For example, a sample can be loaded onto the sample mounting surface (not shown) within inner chamber 1135 along a line of clearance 1145 formed by feedthrough ports 1130 and 1140. In this example, each feedthrough port of top plate 210 and bottom plate 220 can provide respective lines of input/output pairs access to the sample mounting surface (not shown) within inner chamber 1135 to propagate inputs to the sample and outputs from the sample responsive to the inputs.

Figure 12:
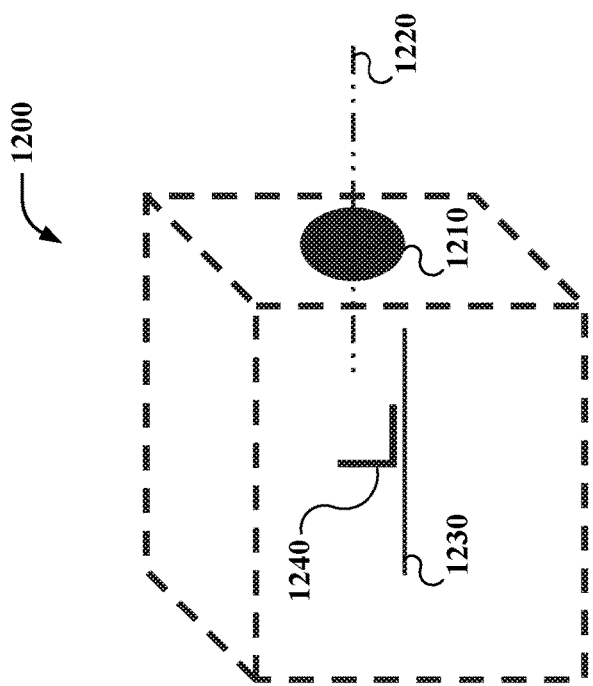
FIG. 12 illustrates an example, non-limiting inner chamber, in accordance with one or more embodiments described herein.

FIG. 12 illustrates an example, non-limiting inner chamber 1200, in accordance with one or more embodiments described herein. As illustrated by FIG. 12, inner chamber 1200 comprises a feedthrough port 1210 that can be aligned with a feedthrough port provided in a sidewall of an outer vacuum chamber encompassing inner chamber 1200 to form a line of clearance 1220. Feedthrough port 1210 can facilitate loading a sample onto sample mounting surface 1230 from a region external to the outer vacuum chamber. Sample mounting surface 1230 comprises a thermal anchor 1240 that facilitates thermally sinking the sample loaded via feedthrough port 1210 to sample mounting surface 1230. To that end, thermal anchor 1240 can be thermally coupled to sample mounting surface 1230.

In the embodiment of FIG. 12, thermal anchor 1240 is illustrated as an "L" bracket comprising thermally conductive material (e.g., copper, gold, brass, stainless steel, silver, platinum, and the like). In other embodiments, thermal anchor 1240 can be implemented using a different mechanism that facilitates thermally sinking samples to sample mounting surface 1230. For example, thermal anchor 1240 can be implemented using a clamping mechanism comprising thermally conductive material that applies a clamping force to a sample that is brought into contact with the clamping mechanism. In an embodiment, inner chamber 1200 further comprises an additional feedthrough port that provides access to a release mechanism that facilitates disengaging a clamping force that thermal anchor 1240 applies to a sample.

Embodiments of the present invention may be a system, a method, and/or an apparatus at any possible technical detail level of integration. What has been described above includes mere examples of systems, methods, and apparatus. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed is:

1. An outer vacuum chamber of a cryostat, comprising:
    a sidewall vertically intervening between a top plate and a bottom plate that are horizontally positioned, wherein the sidewall encompasses an inner chamber comprising a sample mounting surface, and wherein the sidewall comprises a feedthrough port providing access to the sample mounting surface from a region external to the outer vacuum chamber; and
    a loading mechanism comprising a side-loading sample exchange mechanism horizontally aligned through the sidewall, wherein the feedthrough port in the sidewall interfaces with the side-loading sample exchange mechanism to facilitate loading a sample onto the sample mounting surface, and wherein the loading mechanism comprises edge welded bellows.

2. The outer vacuum chamber of claim 1, wherein the sidewall is partitioned into a plurality of sections extending between top and bottom plates of the outer vacuum chamber.

3. The outer vacuum chamber of claim 1, wherein the feedthrough port is positioned approximately equidistant from the top and bottom plates of the outer vacuum chamber.

4. The outer vacuum chamber of claim 1, further comprising:
    a vacuum valve coupled to the feedthrough port that maintains a pressure differential between an ambient environment and an interior of the outer vacuum chamber.

5. The outer vacuum chamber of claim 1, further comprising:
    a thermal shield intervening between the feedthrough port and the sample mounting surface, the thermal shield comprising an additional feedthrough port aligned with the feedthrough port to form a line of clearance between the region external to the outer vacuum chamber and the sample mounting surface.

6. The outer vacuum chamber of claim 1, wherein the loading mechanism facilitates loading a sample onto the sample mounting surface via the feedthrough port.

7. The outer vacuum chamber of claim 1, wherein the sample mounting surface comprises a thermal anchor that facilitates thermally sinking a sample that is loaded via the feedthrough port to the sample mounting surface.

8. A cryostat, comprising:
an inner chamber comprising a sample mounting surface and a first feedthrough port aligned with a second feedthrough port disposed on a sidewall of an outer vacuum chamber encompassing the inner chamber to provide access to the sample mounting surface from a region external to the outer vacuum chamber, wherein the sidewall vertically intervenes between top and bottom plates that are horizontally positioned; and
a loading mechanism comprising a side-loading sample exchange mechanism horizontally aligned through the sidewall, wherein the second feedthrough port disposed on the sidewall interfaces with the side-loading sample exchange mechanism to facilitate loading a sample onto the sample mounting surface, and wherein the loading mechanism comprises edge welded bellows.

9. The cryostat of claim 8, wherein the sidewall is partitioned into a plurality of sections extending between the top and bottom plates of the outer vacuum chamber.

10. A cryostat housing, comprising:
an outer vacuum chamber comprising a sidewall vertically intervening between a top plate and a bottom plate that are horizontally positioned, wherein the sidewall encompasses an inner chamber comprising a sample mounting surface, and wherein the sidewall comprises a feedthrough port providing access to the sample mounting surface from a region external to the outer vacuum chamber; and
a loading mechanism comprising a side-loading sample exchange mechanism horizontally aligned through the sidewall, wherein the feedthrough port in the sidewall interfaces with the side-loading sample exchange mechanism to facilitate loading a sample onto the sample mounting surface, and wherein the loading mechanism comprises edge welded bellows.

11. The cryostat housing of claim 10, wherein the sidewall is partitioned into a plurality of sections extending between top and bottom plates of the outer vacuum chamber.

12. The outer vacuum chamber of claim 10, wherein the feedthrough port is positioned approximately equidistant from the top and bottom plates of the outer vacuum chamber.

13. The cryostat housing of claim 10, further comprising:
a vacuum valve coupled to the feedthrough port that maintains a pressure differential between an ambient environment and an interior of the outer vacuum chamber.

14. The cryostat housing of claim 10, further comprising:
a thermal shield intervening between the feedthrough port and the sample mounting surface, the thermal shield comprising an additional feedthrough port aligned with the feedthrough port to form a line of clearance between the region external to the outer vacuum chamber and the sample mounting surface.

15. The cryostat housing of claim 10, wherein the loading mechanism facilitates loading a sample onto the sample mounting surface via the feedthrough port.

16. The cryostat housing of claim 10, wherein the sample mounting surface comprises a thermal anchor that facilitates thermally sinking a sample that is loaded via the feedthrough port to the sample mounting surface.

17. The cryostat of claim 8, wherein the first feedthrough port or the second feedthrough port is positioned approximately equidistant from the top and bottom plates of the outer vacuum chamber.

18. The cryostat of claim 8, further comprising:
a vacuum valve coupled to the second feedthrough port that maintains a pressure differential between an ambient environment and an interior of the outer vacuum chamber.

19. The cryostat of claim 8, further comprising:
a thermal shield intervening between the second feedthrough port and the sample mounting surface, the thermal shield comprising the first feedthrough port, wherein the first feedthrough port is aligned with the second feedthrough port to form a line of clearance between the region external to the outer vacuum chamber and the sample mounting surface.

20. The cryostat of claim 8, wherein the sample mounting surface comprises a thermal anchor that facilitates thermally sinking a sample that is loaded via the second feedthrough port to the sample mounting surface.

* * * * *